US008547454B2

United States Patent
Kim et al.

(10) Patent No.: US 8,547,454 B2
(45) Date of Patent: Oct. 1, 2013

(54) DIGITAL IMAGE PHOTOGRAPHING APPARATUSES AND METHODS OF CONTROLLING THE SAME TO PROVIDE LOCATION INFORMATION

(75) Inventors: Young-hoon Kim, Seoul (KR); Nam-young Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 13/238,618

(22) Filed: Sep. 21, 2011

(65) Prior Publication Data

US 2012/0162481 A1 Jun. 28, 2012

(30) Foreign Application Priority Data

Dec. 23, 2010 (KR) .................. 10-2010-0133718

(51) Int. Cl.
*H04N 5/262* (2006.01)

(52) U.S. Cl.
USPC ...................................... 348/240.1

(58) Field of Classification Search
USPC ............... 348/116, 240.1, 333.02, 207.99, 348/240.99, 345, 347, 240.2, 240.3
See application file for complete search history.

(56) References Cited

U.S. PATENT DOCUMENTS

| 7,126,626 | B2 * | 10/2006 | Sawahara et al. | 348/14.02 |
|---|---|---|---|---|
| 7,930,101 | B2 * | 4/2011 | Geelen et al. | 701/436 |
| 8,301,202 | B2 * | 10/2012 | Lee | 455/566 |
| 2008/0147730 | A1 * | 6/2008 | Lee et al. | 707/104.1 |
| 2009/0047010 | A1 * | 2/2009 | Yoshida et al. | 396/127 |
| 2010/0268451 | A1 * | 10/2010 | Choi | 701/201 |

FOREIGN PATENT DOCUMENTS

| JP | 2008-301230 A | 12/2008 |
|---|---|---|
| KR | 1020100080305 A | 7/2010 |

* cited by examiner

*Primary Examiner* — Tuan Ho
*Assistant Examiner* — Ahmed A Berhan
(74) *Attorney, Agent, or Firm* — Drinker Biddle & Reath LLP

(57) ABSTRACT

Digital image photographing apparatuses and methods of controlling the same to provide location information are disclosed. A disclosed example method includes generating a preview image by photographing an object; detecting the current location of the digital image photographing apparatus; detecting a photographing direction in which the digital image photographing apparatus photographed the object; generating distance information regarding the object; and displaying the distance information regarding the object according to the photographing direction around the current location of the digital image photographing apparatus. Digital image photographing apparatuses disclosed herein are capable of providing location information and/or additional information regardless of its their optical limits.

18 Claims, 10 Drawing Sheets

DIGITAL IMAGE PHOTOGRAPHING APPARATUSES AND METHODS OF CONTROLLING THE SAME TO PROVIDE LOCATION INFORMATION

CROSS-REFERENCE TO RELATED PATENT APPLICATION

This application claims the priority benefit of Korean Patent Application No. 10-2010-0133718, filed on Dec. 23, 2010, in the Korean Intellectual Property Office, the entirety of which is incorporated herein by reference.

BACKGROUND

1. Field of the Invention

The invention relates to digital image photography and, more particularly, to digital image photographing apparatuses and methods of controlling the same to provide location information.

2. Description of the Related Art

A digital image photographing apparatus may display an image of a view seen through a lens on a display screen. A digital image photographing apparatus may display a preview image before an image is captured, and may display a captured image after the image is captured. However, the preview image may be limited by the characteristics of a lens.

SUMMARY

This application discloses digital image photographing apparatuses capable of providing location information and/or additional information regardless of its optical limits and methods of controlling the digital image photographing apparatuses.

According to an aspect of the invention, there is provided a method of controlling a digital image photographing apparatus, the method including generating a preview image by photographing an object; detecting the current location of the digital image photographing apparatus; detecting a photographing direction in which the digital image photographing apparatus photographed the object; generating distance information regarding the object; and displaying the distance information regarding the object according to the photographing direction around the current location of the digital image photographing apparatus.

The method may further include acquiring additional information regarding the object from a database storing additional information, according to location information of the object; and displaying the additional information.

Displaying the distance information regarding the object may include displaying the preview image and the distance information regarding the object.

The method may further include detecting one or more objects of interest located within a predetermined distance range around the current location of the digital image photographing apparatus; generating distance information regarding the objects of interest; and displaying the distance information regarding the objects of interest.

The method may further include setting the predetermined distance range around the current location of the digital image photographing apparatus, according to a user operation.

Setting the predetermined distance range around the current location of the digital image photographing apparatus, according to a user operation, may include setting a larger distance range from the current location of the digital image photographing apparatus as the user operates an operating unit for instructing enlargement of an image.

The method may further include detecting additional information regarding the objects of interest from a database storing additional information, according to the objects of interest; and displaying the information regarding the objects of interest.

The digital image photographing apparatus may include a display unit on a front surface and on a rear surface, the distance information may be displayed on one of the display units, and the additional information may be displayed on the other one of the display units.

The method may further include performing auto-focus (AF) with respect to the preview image to focus on the object, wherein generating distance information regarding the object may include generating the distance information regarding the object via the AF operation.

The method may further include applying an optical zoom or a digital zoom; and determining whether maximum optical zoom and/or maximum digital zoom is/are applied, wherein displaying the distance information regarding the object may include displaying the distance information regarding the object in the photographing direction from the current location of the digital image photographing apparatus when the maximum optical zoom and/or the maximum digital zoom is/are applied.

According to another aspect of the invention, there is provided a digital image photographing apparatus including a preview generating unit for generating a preview image by photographing an object; a location information detecting unit for detecting the current location of the digital image photographing apparatus; a directional information detecting unit for detecting a photographing direction in which the digital image photographing apparatus photographed the object; a first distance information generating unit for generating distance information regarding the object; and a display image generating unit for generating a first display image that displays the distance information regarding the object, according to the photographing direction around the current location of the digital image photographing apparatus.

The digital image photographing apparatus may further include an additional information generating unit for acquiring additional information regarding the object from a database storing additional information, according to location information of the object, wherein the display image generating unit may further generate a second display image that displays the additional information.

The display image generating unit may generate a third display image that displays the preview image and the distance information regarding the object.

The digital image photographing apparatus may further include a detecting unit for detecting one or more objects of interest located within a predetermined distance range around the current location of the digital image photographing apparatus; and a second distance information generating unit for generating distance information regarding the objects of interest, wherein the display image generating unit may generate a fourth display image that displays the distance information regarding the objects of interest.

The digital image photographing apparatus may further include a distance range setting unit for setting the predetermined distance range around the current location of the digital image photographing apparatus.

The digital image photographing apparatus may further include an operation console by which a user may instruct to enlarge the image, wherein the distance range setting unit may set a farther distance range from the current location of the digital image photographing apparatus as the user operates an operating unit for instructing enlargement of an image.

The digital image photographing apparatus may further include an additional information generating unit for detecting additional information regarding the objects of interest from a database storing additional information, according to the objects of interest, wherein the display image generating unit may generate a fifth display image that displays the information regarding the objects of interest.

The digital image photographing apparatus includes a display unit on a front surface and on a rear surface, wherein the first display image or a fourth display image may be displayed on one of the display units, and the second display image or a fifth display image may be displayed on the other one of the display units.

The digital image photographing apparatus may further include a focus adjusting unit for performing AF with respect to the preview image to focus on the object, wherein the first distance information generating unit may generate the distance information regarding the object via the AF operation.

The digital image photographing apparatus may further include a driving unit for applying an optical zoom; an image enlarging unit for applying a digital zoom; and a determining unit for determining whether maximum optical zoom and/or maximum digital zoom is/are applied, wherein the display image generating unit may generate the first display image that displays the distance information regarding the object in the photographing direction from the current location of the digital image photographing apparatus when the maximum optical zoom and/or the maximum digital zoom is/are applied.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Digital image photographing apparatuses, according to embodiments of the invention, will be described below in detail with reference to the attached drawings. In the embodiments described below, a digital camera is provided as an example of a digital image photographing apparatus. However, the invention is not limited thereto, and the invention may be applied to other digital apparatuses such as a digital camcorder, a personal digital assistant, a smart phone, etc.

Figure 1:
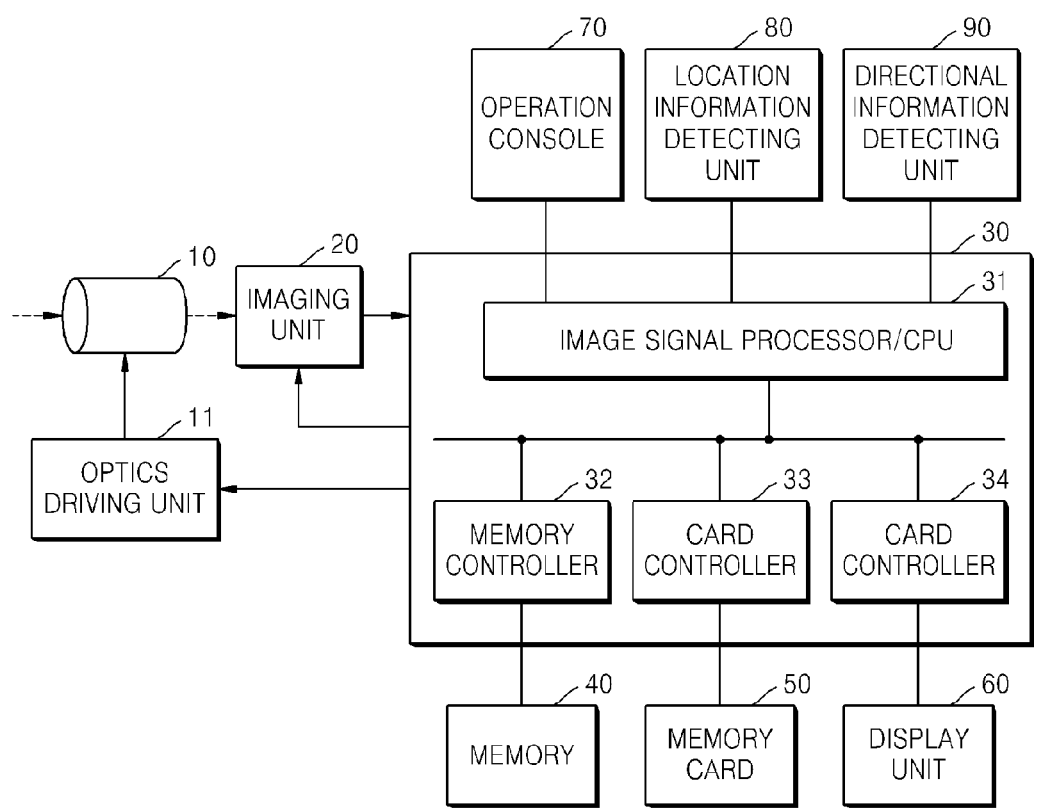
FIG. 1 is a block diagram of a digital camera, which is an example of a digital image photographing apparatus, according to an embodiment of the invention.

FIG. 1 is a block diagram of a digital camera, which is an example of a digital image photographing apparatus, according to an embodiment of the invention.

Referring to FIG. 1, the digital camera includes an optical unit 10, an optics driving unit 11 for driving the optical unit 10, an imaging unit 20, a camera control unit 30, a memory 40, a memory card 50, a display unit 60, an operation console 70, a location information detecting unit 80, and a direction information detecting unit 90.

The optical unit 10 includes an imaging optical unit, a shutter, and an aperture for collecting optical signals from an object. The imaging optical unit includes a focus lens for adjusting focus and a zoom lens for adjusting focal length.

The optics driving unit 11 may include a focus lens driving unit for repositioning the focus lens, an aperture driving unit for changing the aperture, and a shutter driving unit for controlling opening and closing of the shutter.

The imaging unit 20 includes an imaging device that generates an image signal by capturing light transmitted through the imaging optical unit of the optical unit 10. The imaging device may include a plurality of photoelectric converting units arranged in a matrix shape, and horizontal and/or vertical transmitting paths for acquiring an image signal by transporting charges in synchronization with a timing signal. The imaging device may be a charge-coupled device (CCD) sensor, a complementary metal-oxide semiconductor (CMOS) sensor, or the like. In the case of using a CCD sensor as the imaging device, the digital camera may further include a correlated double sampling (CDS)/amplifier (AMP) for removing low frequency waves present in an electrical signal output by the imaging device and amplifying the electrical signal to a particular level, and an analog-to-digital (A/D) converter for converting an electrical signal output by the CDS/AMP to a digital signal.

Furthermore, the digital camera includes the camera control unit 30. The camera control unit 30 includes an image signal processor/CPU 31.

The image signal processor/CPU 31 may calculate an auto white balance (AWB) evaluation value for white balance adjustment, an auto exposure (AE) evaluation value for exposure adjustment, and an AF evaluation value for focus adjustment with respect to an image signal output by the imaging unit 20 and may appropriately control white balance adjustment, exposure adjustment, and focus adjustment based on the calculated evaluation values. Furthermore, the image signal processor/CPU 31 may perform various application operations, e.g., object detection (e.g., face detection) and scene detection, with respect to the input image signal. Furthermore, the image signal processor/CPU 31 may perform image processes for storing an image, and image processes for displaying the image. Examples of the image processes include gamma correction, color filter array interpolation, color matrix, color correction, color enhancement, etc. Furthermore, for storage of an image, a compression process may be performed in accordance with a joint photographic experts group (JPEG) compression format or a Lempel-Ziv-Welch (LZW) compression format.

Furthermore, the camera controller 30 includes a memory controller 32, a card controller 33, and a display controller 34.

The memory controller 32 may temporarily store a captured image and various information in the memory 40, or may output a captured image and various information from the memory 40. Furthermore, the memory controller 32 may read program data stored in the memory 40. The memory 40 is a buffer memory for temporarily storing a captured image and various information, and may be a dynamic random-access memory (DRAM) or a synchronous DRAM (SDRAM). Furthermore, the memory 40 may include a storage unit for storing programs and, thus, may include a flash memory or a read-only memory (ROM).

The card controller 33 may store and read an image file in and out of the memory card 50. The card controller 33 may store and read not only an image file, but also various information to be stored in the memory card 50. The memory card 50 may be a secure digital (SD) card, for example. Although the memory card 50 is used as a storage medium in the present embodiment, the invention is not limited thereto, and an image file and various information may be stored using any of various recording media including an optical disk (a compact disc (CD), a digital versatile disc (DVD), a Blu-ray disc, etc.), an optomagnetic disk, a magnetic disk, a solid-state memory device, or the like. In the case of using an optical disk (a CD, a DVD, a Blu-ray disc, etc.) as a recording medium, a device for reading out the optical disk may be provided.

The display controller 34 may control image display on the display unit 60. The display unit 60 may be a liquid crystal display (LCD) device or an organic light-emitting diode (OLED) device.

The digital camera includes the operation console 70 that may be used by a user to input operation commands. The operation console 70 may include elements via which a user operates the digital camera or adjusts various settings during a photographing operation. For example, the operation console 70 may include buttons, keys, touch panels, touch screens, dials, etc., via which various user operation signals, for example, power on/off, photographing start/stop, playback start/stop/browse, driving the optical unit, switching modes (e.g., a motion picture capturing mode start), menu manipulation, selection, etc., may be input. For example, a shutter button may be half-pressed, fully-pressed, or released by a user. When the shutter button is half-pressed (operation S1), the shutter button outputs a focus control start operation signal, and, when the shutter button is released, a focus control is terminated. The shutter button may output a photographing start operation signal when the shutter button is fully pressed (operation S2). The operation signals may be transmitted to the image signal processor/CPU 31 and, thus, corresponding components may be driven.

Furthermore, the digital camera includes the location information detecting unit 80. For example, the digital camera may include a global positioning system (GPS) receiver. The digital camera may receive current location information from a GPS satellite and store the current location information.

Furthermore, the digital camera includes the direction information detecting unit 90. The direction information detecting unit 90 may include a directional sensor. Therefore, the direction information detecting unit 90 may detect a direction in which the digital camera captures an image.

Figure 2:
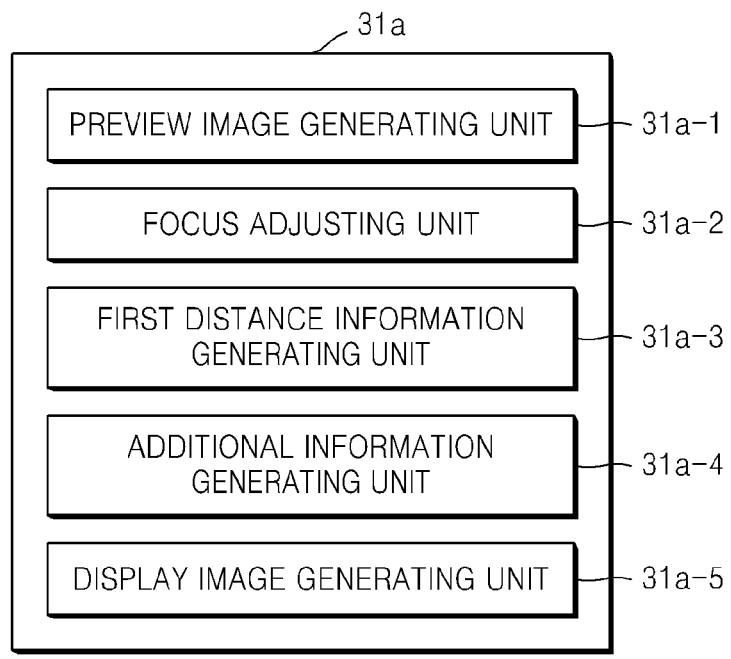
FIG. 2 is a block diagram for describing an image signal processor/CPU of the digital camera of FIG. 1, according to an embodiment of the invention.

FIG. 2 is a block diagram for describing an image signal processor/CPU 31a that may be used to implement the image signal processor/CPU 31 of the digital camera of FIG. 1, according to an embodiment of the invention.

Referring FIG. 2, the image signal processor/CPU 31a, according to the present embodiment, includes a preview image generating unit 31a-1, a first distance information generating unit 31a-3, an additional information generating unit 31a-4, and a display image generating unit 31a-5.

An optical signal representing an object is input via the optical unit 10 and results in an input image at the imaging unit 20. The preview image generating unit 31a-1 generates a preview image, which is to be displayed on the display unit 60, with respect to the input image.

The first distance information generating unit 31a-3 generates distance information regarding a distance from the object. The distance information may be calculated by performing focus adjustment with respect to the preview image. The image signal processor/CPU 31a may further include a focus adjusting unit 31a-2 for performing automatic focus adjustment with respect to the preview image. An object distance corresponding to a position of the focus lens, at which an object area in the preview image is in focus, may be calculated by detecting the position of the focus lens.

The image signal processor/CPU 31a may include the display image generating unit 31a-5 for generating a first display image displaying distance information of the object from a current location of the digital image photographing apparatus in the photographing direction. The display image generating unit 31a-5 may generate the first display image displaying the object relocated from the digital camera by the object distance in a direction away from a user, the direction being detected by the direction information detecting unit 90 of FIG. 1.

The image signal processor/CPU 31a may further include the additional information generating unit 31a-4 that generates additional information regarding the object using the location information of the object generated by the location information generating unit 80. In detail, additional information regarding the object may be extracted from a database storing additional information according to the location information of the object. Next, the display image generating unit 31a-5 may generate a second display image including the additional information. Alternatively, if the object is selected in the first display image displaying the object, a third display image displaying the additional information for the object or a third display image in which the object distance information and/or additional information for the object is/are displayed on the preview image.

Figure 3:
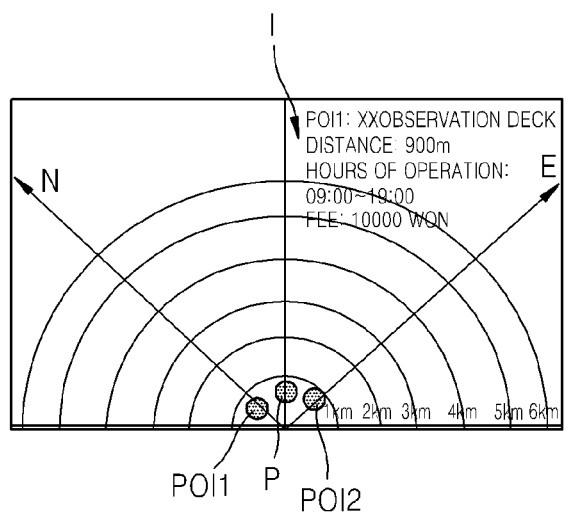
FIG. 3 shows an example of a first display image.

FIG. 3 shows an example of the first display image. Referring to FIG. 3, distances are marked every 1 km in directions around the digital camera and away from a location of the digital camera, and distance information of an object POL1 is indicated by displaying the location of the object POL1 relative to distance markings. Furthermore, a distance to the object POL1 may be directly displayed as 900 m. Furthermore, the name, hours of operation, and fee are displayed in the upper right portion as additional information I regarding the object POL1. However, the invention is not limited thereto, and a separate pop-up window may be used to display additional information.

Figure 4:
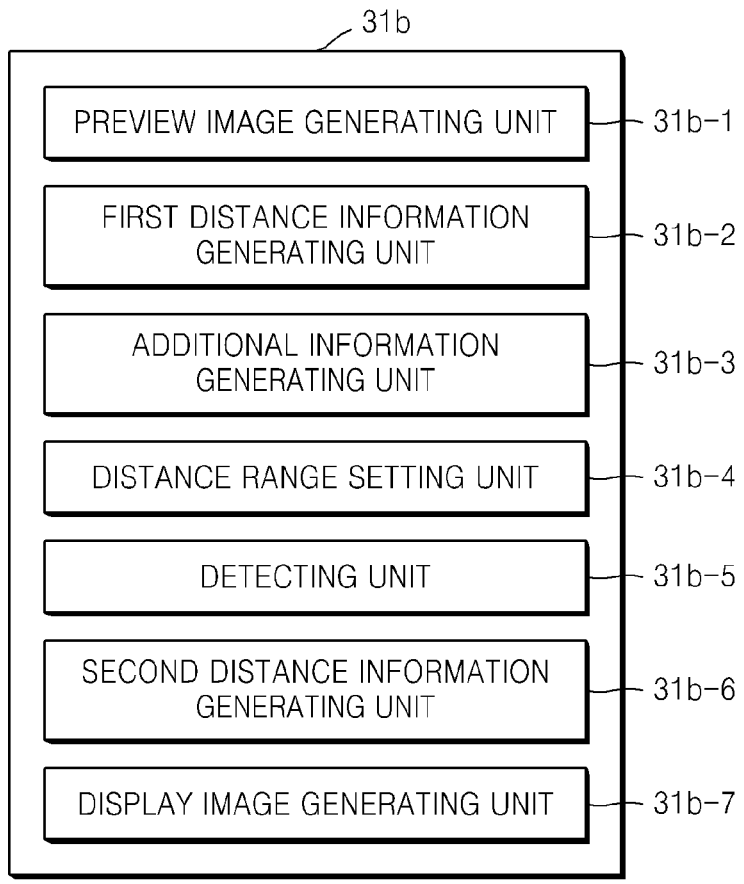
FIG. 4 is a block diagram for describing an image signal processor/CPU of the digital camera of FIG. 1, according to another embodiment of the invention.

FIG. 4 is a block diagram for describing an image signal processor/CPU 31b that may be used to implement the example image signal processor/CPU 31 of the digital camera of FIG. 1, according to another embodiment of the invention.

Referring to FIG. 4, the image signal processor/CPU 31b, according to the present embodiment, includes a preview image generating unit 31b-1 for generating a preview image from an input image generated by the imaging unit 20 of FIG.

1). Furthermore, the image signal processor/CPU 31*b* includes a first distance information generating unit 31*b*-2 for generating distance information regarding a distance from an object based on the preview image. Furthermore, the image signal processor/CPU 31*b* includes an additional information generating unit 31*b*-3 for extracting and generating additional information regarding the object from a database storing additional information for objects. The database may be stored in the memory 40 of the digital camera. Alternatively, the database may be stored in an external device, such as a server, and information in the database may be accessed by communicating with the external device. In this case, although not shown, the digital camera of FIG. 1 may further include a communication unit for accessing the external device. In the present embodiment, the image signal processor/CPU 31*b* may further include a detecting unit 31*b*-5 that detects an object of interest within a preset distance range around the digital camera. Furthermore, the image signal processor/CPU 31*b* may further include a second distance information generating unit 31*b*-6 for generating distance information regarding a distance from the object of interest. A display image generating unit 31*b*-7 may generate a fourth display image displaying the distance information of the object of interest.

The image signal processor/CPU 31*b*, according to the present embodiment, may further include a distance range setting unit 31*b*-4 for setting a predetermined distance range around a current location of the digital camera. For example, a user may set the distance range by operating a zoom lever. The zoom lever is one way for operating optical zoom or digital zoom. When the zoom lever is pulled, a zooming operation for narrowing viewing angle and increasing focal length is performed in the optical zoom, whereas a zooming operation of enlarging an image is performed in the digital zoom. As the zoom lever is pulled, objects of interest may be detected and displayed in a wider distance range around the digital camera. Detailed descriptions thereof will be given below with reference to the attached drawings.

The detecting unit 31*b*-5 may detect one or more objects of interest within a distance range set by the distance range setting unit 31*b*-4. Furthermore, the second distance information generating unit 31*b*-6 may generate distance information regarding distance from the detected object of interest. The distance information of the object of interest may be calculated using the current location information of the digital camera and the location information of the object of interest. The current location information of the digital camera may be acquired by the location information generating unit 80 shown in FIG. 1, whereas the location information of the object of interest may be acquired from a database that stores location information according to objects of interest and may be stored in the memory 40 or an external device. Information regarding an object of interest located in a predetermined distance range and the location information of the object of interest may be detected in the database and acquired.

The display image generating unit 31*b*-7 may generate a display image displaying distance information of the object, additional information for the object, distance information of the object of interest, and/or additional information for the object of interest. The display image may be displayed on the display unit 60.

FIGS. 5 through 10 are diagrams for describing an example of distance information of an object and distance information of an object of interest that are displayed on a digital camera by the image signal processor/CPU 31*b* shown in FIG. 4, according to an embodiment of the invention.

Figure 5:
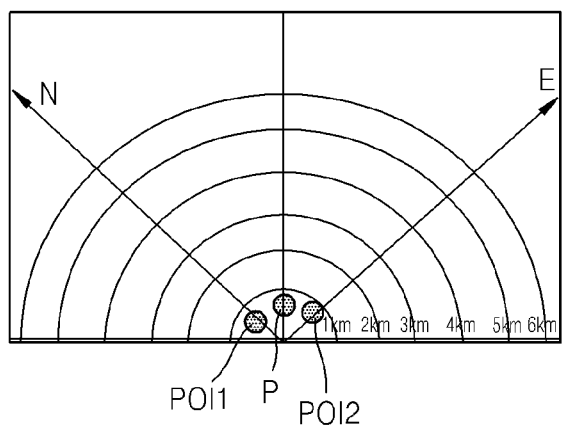
FIGS. 5 through 10 are diagrams for describing an example of distance information of an object and distance information of an object of interest that are displayed on a digital camera by the image signal processor/CPU shown in FIG. 4.

When the maximum optical zoom and the maximum digital zoom are applied and if a zoom lever is pulled again, an object of interest located within a range of 1 km around the digital camera may be detected and distance information of the object of interest may be displayed. In FIG. 5, two objects of interest POI1 and POI2 within a range of 1 km around the digital camera are detected, and distance information of the objects of interest POI1 and POI2 are displayed as dots in the distance range of 1 km. Furthermore, a distance from an object P is also displayed.

Figure 6:
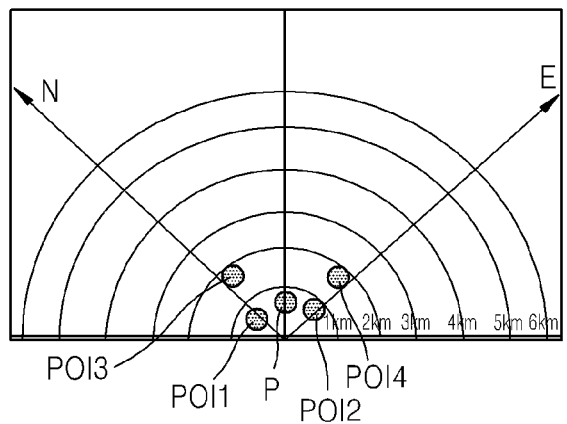

Referring to FIG. 6, if the zoom lever is pulled again, two objects of interest POI3 and POI4 within a range of 2 km around the digital camera are further detected, and distance information of the objects of interest POI3 and POI4 are displayed as dots in the distance range of 2 km.

Figure 7:
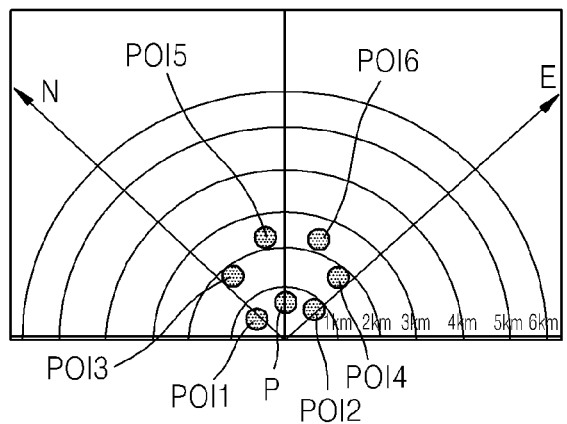

Referring to FIG. 7, as the zoom lever is pulled yet again, two objects of interest POI5 and POI6 within a range of 3 km around the digital camera are detected, and the objects of interest POI3 and POI4 are displayed as dots at corresponding locations.

Figure 8:
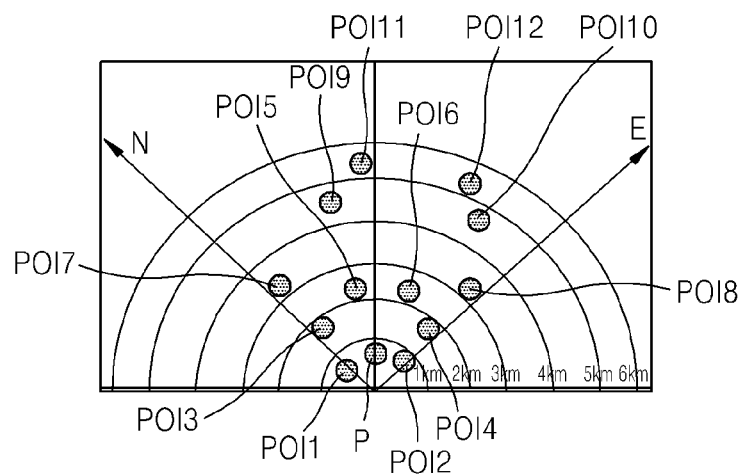

Furthermore, as the zoom lever is pulled still again, two objects of interest POI11 and POI12 within a range of 6 km around the digital camera are detected, and the objects of interest POI11 and POI12 are displayed, as shown in FIG. 8.

Figure 9:
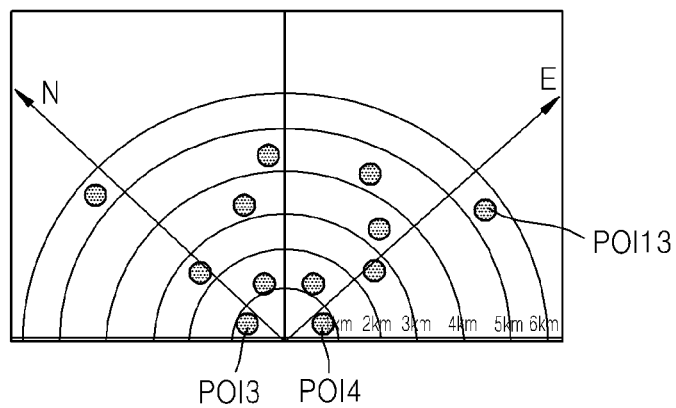

The digital camera may display objects and objects of interest in directions around the digital camera within a range of 6 km in a single screen image. Here, if the zoom lever is pulled another time, objects and objects of interest in directions around the digital camera within a range of 7 km may be displayed. However, due to the size limit of the display image, only distance information regarding objects of interest within ranges of distances from 1 km to 7 km may be displayed. In other words, as shown in FIG. 9, although an object of interest POI13 within a range of 7 km is detected, distance information regarding objects of interest within ranges from 1 km to 7 km may be displayed to display distance information of the object of interest POI13.

Figure 10:
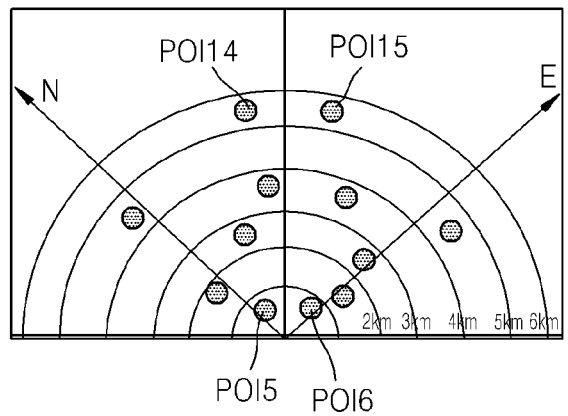

Furthermore, as shown in FIG. 10, if the zoom lever is pulled again, an object of interest POI14 within a range of 8 km around the digital camera is detected, and the object of interest POI14 is displayed as a dot at corresponding location.

Although not shown, if a detected object of interest is selected, additional information of the selected object of interest may be displayed together or as a fifth display image in a separate window.

Figure 11:
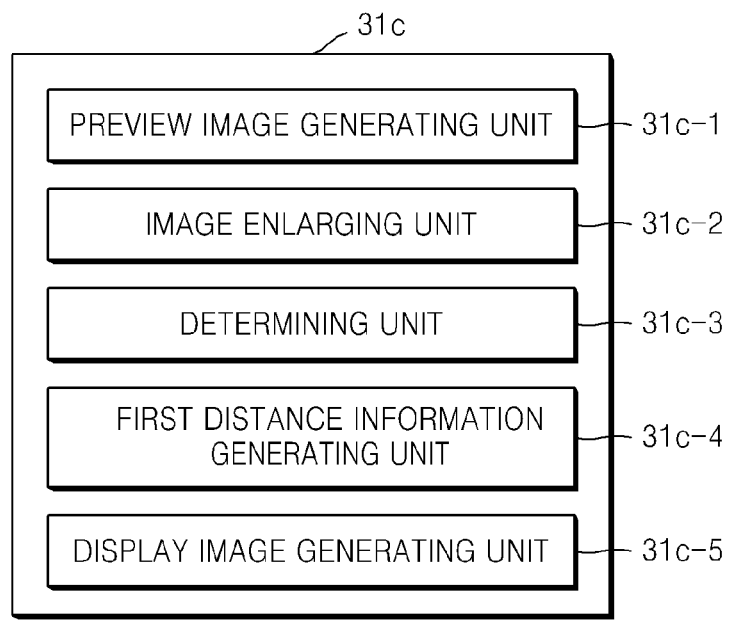
FIG. 11 is a block diagram for describing an image signal processor/CPU of the digital camera of FIG. 1, according to another embodiment of the invention.

FIG. 11 is a block diagram for describing an image signal processor/CPU 31*c* that may be used to implement the image signal processor/CPU 31 of the digital camera of FIG. 1, according to another embodiment of the invention.

Referring to FIG. 11, the image signal processor/CPU 31*c* includes a preview image generating unit 31*c*-1, an image enlarging unit 31*c*-2, a determining unit 31*c*-3, a first distance information generating unit 31*c*-4, and a display image generating unit 31*c*-5.

An optical signal representing an object is input via the optical unit 10 and results in an input image at the imaging unit 20 of FIG. 1. The preview image generating unit 31*c*-1 converts the input image to a preview image, which is suitable to be displayed on the display unit 60.

A user may operate optical zoom or digital zoom while viewing the preview image. The user may control optical zoom operation by moving a zoom lens to increase focal length and to narrow viewing angle, or to reduce focal length and widening viewing angle. The optical zoom operation is performed by an optical driving unit 11 of FIG. 1) and may be controlled by a user via the operation console 70 of FIG. 1). If the maximum optical zoom is applied, a digital zoom may be applied thereto. The digital zoom operation may be performed by enlarging the preview image. A user may perform the digital zoom operation by operating the operation console 70. For the digital zoom application, the image signal processor/CPU 31c may include the image enlarging unit 31c-2.

Furthermore, if the maximum digital zoom is applied and a user performs a further zoom operation by operating the operation console 70, an extended digital zoom may be applied.

The determining unit 31c-3 may determine whether the maximum optical zoom and/or the maximum digital zoom is/are applied. In the present embodiment, it is determined whether the maximum optical zoom and/or the maximum digital zoom is/are applied, and if the maximum optical zoom and/or the maximum digital zoom is/are applied, the extended digital zoom is applied. However, the invention is not limited thereto, and the extended digital zoom may be performed while the optical zoom and/or the digital zoom is/are being operated. For example, the extended digital zoom may be performed by operating another function button or differently operating a zoom lever while the optical zoom and/or the digital zoom is/are being operated by operating the zoom lever. The extended digital zoom is for displaying a display image displaying distance information of the object, additional information of the object, distance information of the object of interest and/or additional information of the object of interest.

As described above, the first distance information generating unit 31c-4 generates distance information regarding a distance from the object, and, in the case where the maximum optical zoom and/or the maximum digital zoom is/are applied, the display image generating unit 31c-5 may generate a first display image displaying distance information of the object from a current location of the digital camera in the photographing direction. The generated first display image is displayed on a display unit 60 of FIG. 1).

The digital camera may selectively further include the distance range setting unit 31b-4, the detecting unit 31b-5, and the second distance information generating unit 31b-6 as described above.

Figure 12:
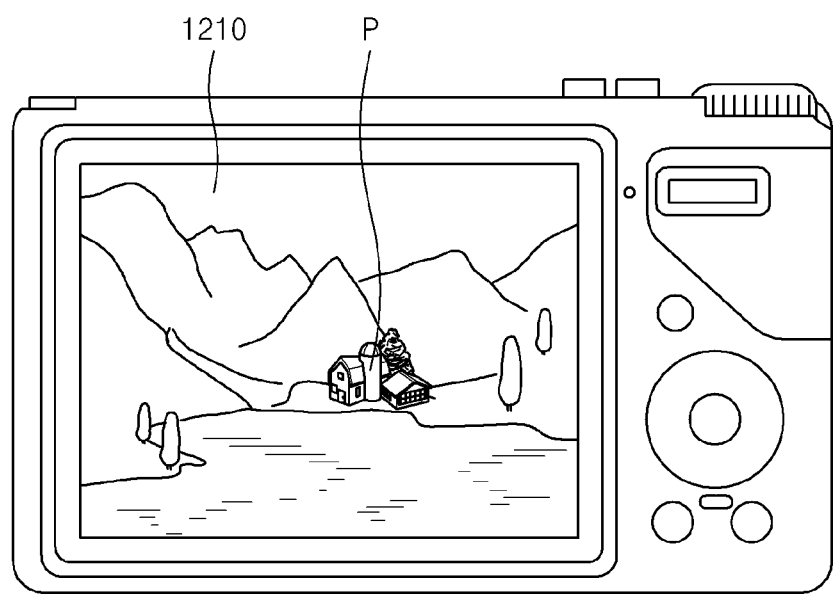
FIGS. 12 through 14 are diagrams for describing an example of a screen image displayed on a digital camera by operating optical zoom, digital zoom, and extended digital zoom via the image signal processor/CPU shown in FIG. 11.
Figure 13:
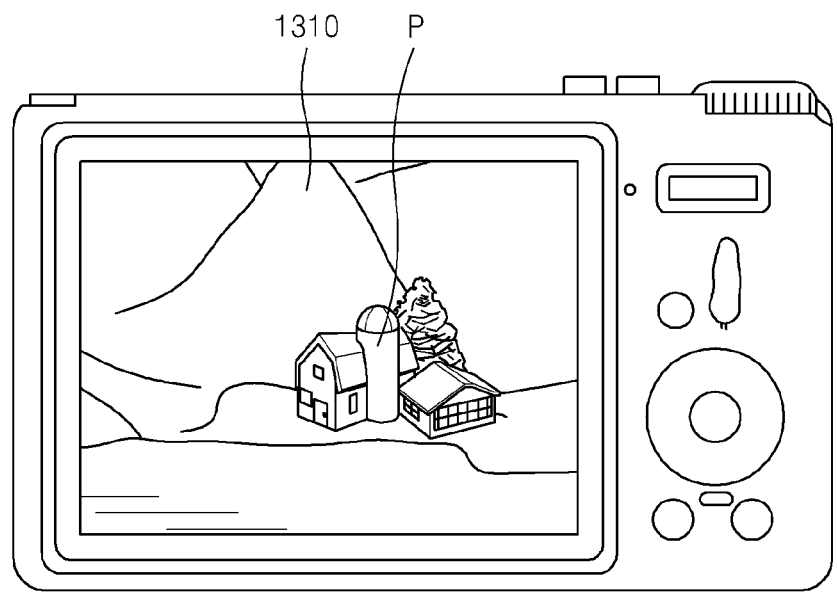
Figure 14:
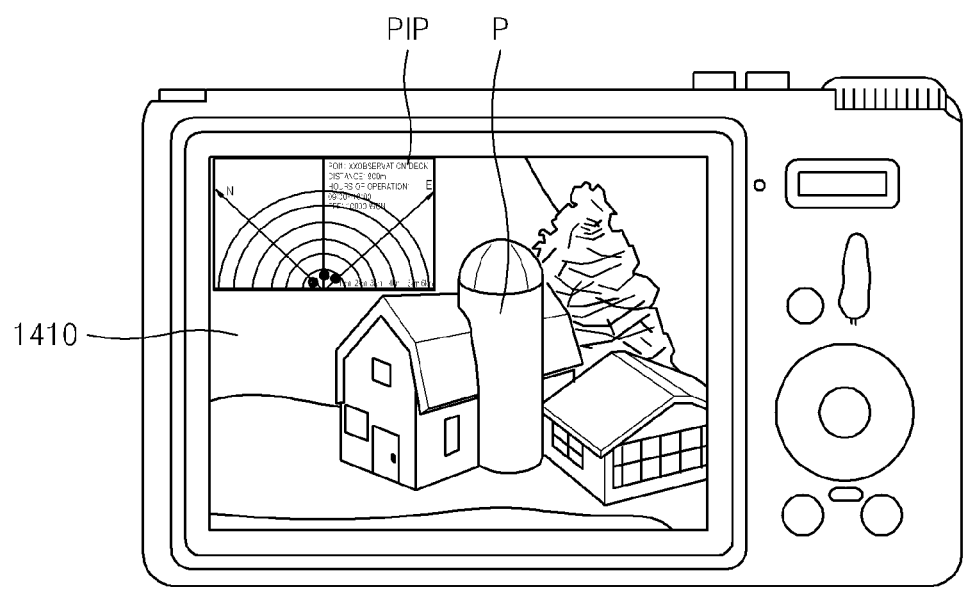

FIGS. 12 through 14 are diagrams for describing an example of a screen image displayed on a digital camera by operating optical zoom, digital zoom, and extended digital zoom via the image signal processor/CPU shown 31c of FIG. 11.

Referring to FIG. 12, a preview image 1210 is generated by photographing an object P using a digital camera and the generated preview image 1210 is displayed.

When a user desires to narrow a viewing angle of the preview image 1210, the user may enlarge the object P by pulling a zoom lever (not shown). Therefore, an enlarged preview image 1310 as shown in FIG. 13 may be generated. Furthermore, when the maximum optical zoom is applied, and if the zoom lever is pulled again, the preview image 1310 may be enlarged and displayed by the image signal processor/CPU 31c as shown in FIG. 14. Furthermore, when the maximum digital zoom is applied and if the zoom lever is pulled again, a first display image PIP, which displays object distance information, may be displayed in the upper left portion of the preview image 1410 to notify that extended digital zoom was performed.

Figure 15:
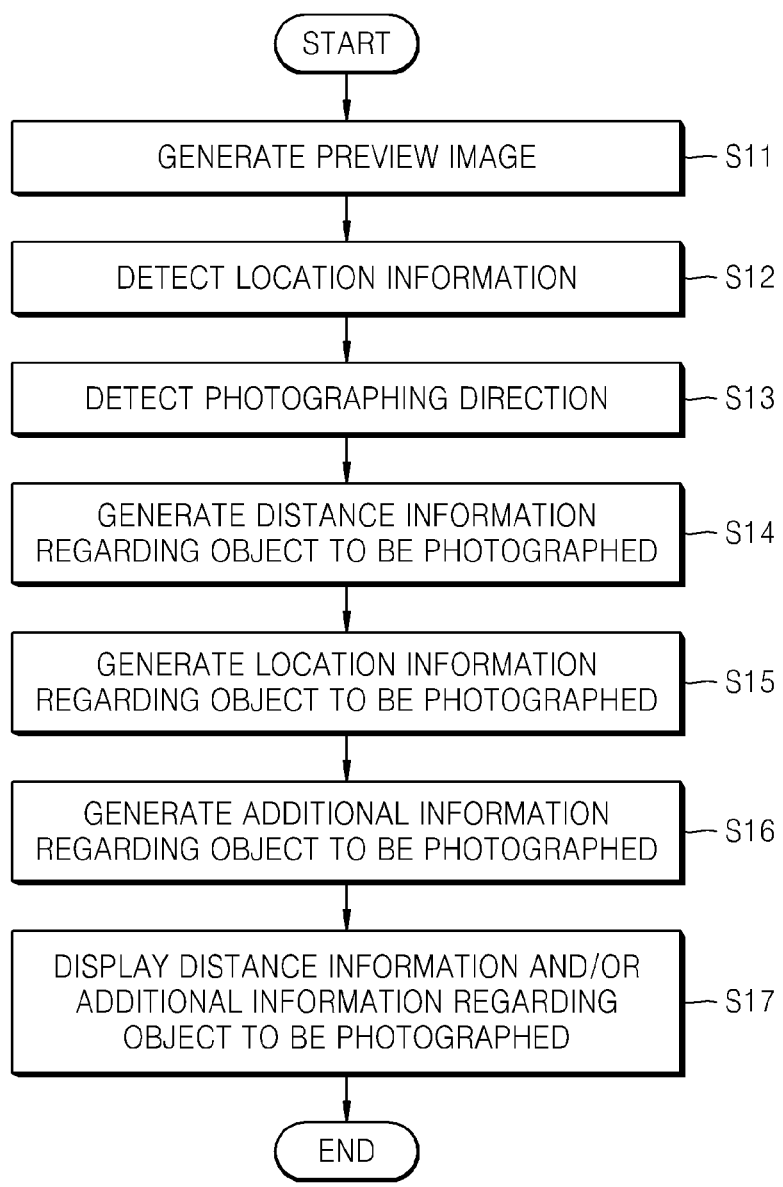
FIG. 15 is a flowchart of a method of controlling a digital image signal processing apparatus, according to an embodiment the invention.

FIG. 15 is a flowchart of a method of controlling a digital image signal processing apparatus, according to an embodiment of the invention.

Referring to FIG. 15, a preview image is generated (operation S11).

Location information regarding the digital image signal processing apparatus, e.g., the digital camera, is detected via the location information detecting unit 80 of the digital camera, e.g., a GPS receiver (operation S12).

Furthermore, the digital camera may detect a photographing direction via the directional information detecting unit 90 (operation S13).

Distance information regarding an object to be photographed is generated (operation S14). The distance information regarding the object may be generated via an auto-focusing operation. Alternatively, the distance information regarding the object may be generated using an infrared sensor.

Location information regarding the object may be generated using the distance information regarding the object (operation S15). The location information regarding the object may be generated using the current location information for the digital camera, the photographing direction, and the distance information regarding the object.

Although the location information regarding the object is generated using the distance information regarding the object in the present embodiment, the invention is not limited thereto. According to another embodiment of the invention, objects of interest located around the current location of the digital camera may be detected, and an object of interest corresponding to the distance information regarding the object may be determined as the object. In this case, the location information regarding the object may be acquired from a database that stores the location information regarding the object as the location information, according to the corresponding object of interest.

Additional information corresponding to the generated location information regarding the object is generated (operation S16). The additional information regarding the object may be extracted from a database storing additional information according to the location information of the object or the object of interest.

A first display image displaying the distance information regarding the object and/or the additional information regarding the object is generated and displayed (operation S17). An example of the first display image is shown in FIG. 3. Distances may be marked at every 1 km in directions around the digital camera and away from the location of the digital camera, and the distance information of the object P may be indicated. Furthermore, the additional information I regarding the object P may be displayed in the upper-right portion of the first display image.

Figure 16:
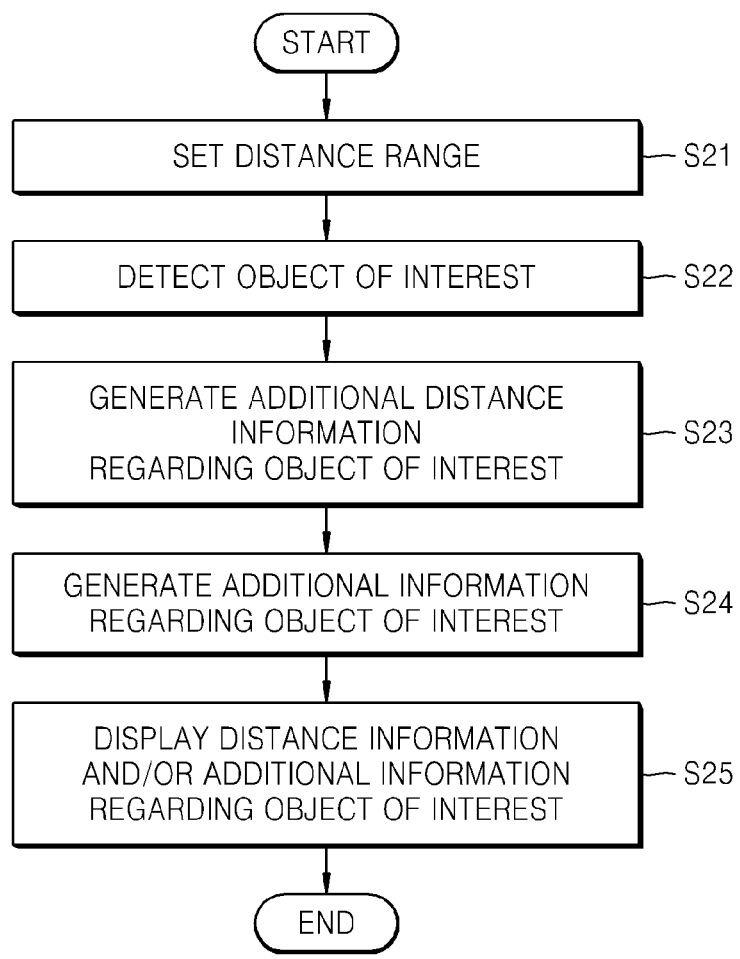
FIG. 16 is a flowchart for describing a method of controlling a digital image signal processing apparatus, according to another embodiment of the invention.

FIG. 16 is a flowchart for describing a method of controlling a digital image signal processing apparatus, according to another embodiment of the invention. In the present embodiment, a method of detecting and displaying not only an object, but also an object of interest will be described in detail. FIG. 16 shows a process that may, for example, be carried out after the process shown in FIG. 15, in which distance information regarding the object and/or additional information regarding the object is/are displayed.

In detail, referring to FIG. 16, a user sets a distance range (operation S21). For example, a user may set a distance range around the current location of a digital camera by pulling a zoom lever. The distance range may increase as the zoom lever is pulled.

Objects of interest are detected within the set distance range (operation S22). The objects of interest may be detected in a database storing location information, according to the objects of interest. Since the current location of the digital camera is known, objects of interest located within the set distance range around the current location may be detected.

The database may be stored in the memory 40 of FIG. 1. Alternatively, the database may be stored in an external device. In this case, the digital camera may further include a communication unit for accessing the external device to acquire information stored in the database.

Distance information regarding the detected objects of interest with respect to the current location of the digital camera may be generated using the location information of the detected objects of interest (operation S23).

Furthermore, additional information regarding the objects of interest may be acquired (operation S24).

The additional information regarding the objects of interest may also be stored in a database storing additional information according to the objects of interest. The database may also be stored in the memory 40 of FIG. 1. Alternatively, the database may be stored in an external device. In this case, the digital camera may further include a communication unit for accessing the external device to acquire information stored in the database.

Next, the distance information regarding the objects of interest and/or the additional information regarding the objects of interest may be displayed (operation S25). Referring back to FIG. 3, the first display image, in which distance information of the objects of interest POI1 and POI2 located in the distance range of 1 km around the digital camera are displayed, is displayed. When the objects of interest POI1 and POI2 are selected, additional information regarding the selected objects of interest POI1 and POI2 may be further displayed. The additional information may be displayed in a separate window. Alternatively, in the case of a digital camera having display units on both a top surface and a rear surface, distance information regarding the object and/or the objects of interest may be displayed on one of the display units, whereas additional information regarding the object and/or the objects of interest may be displayed on the other one of the display units.

Figure 17:
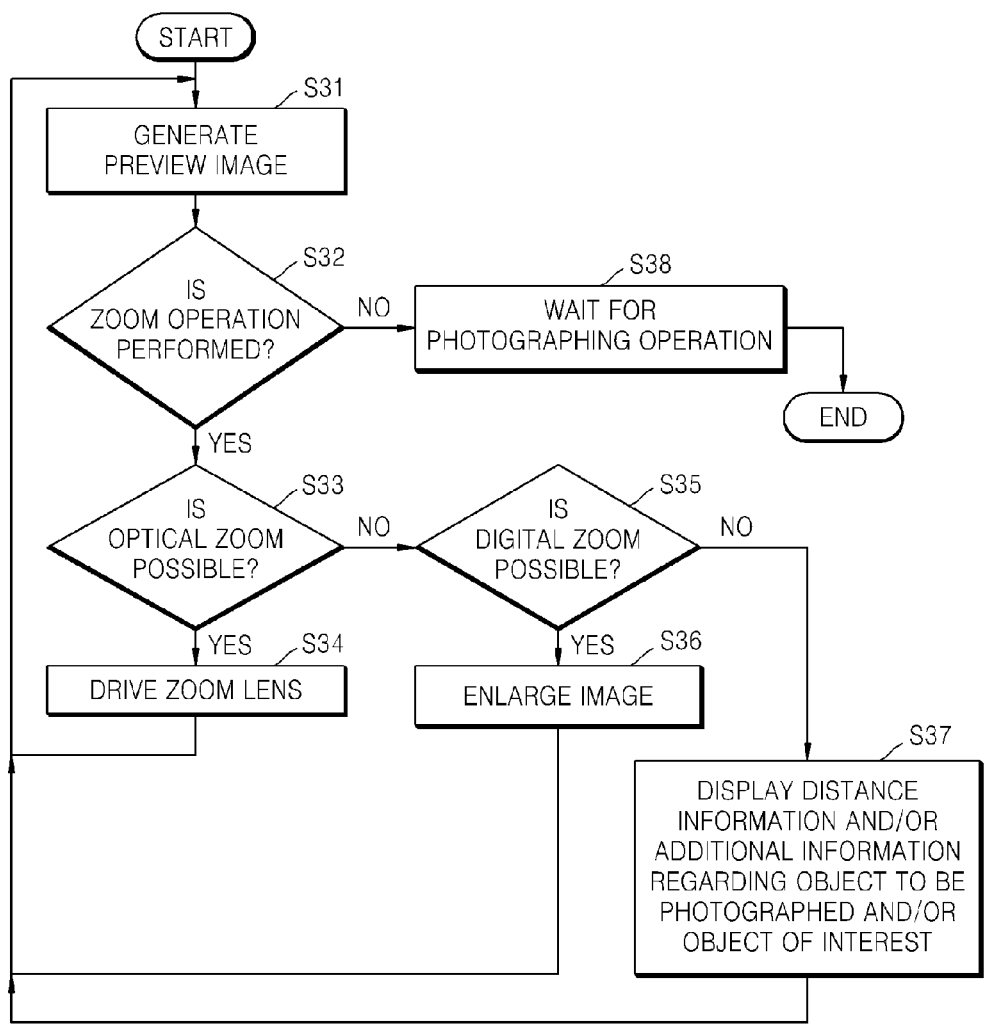
FIG. 17 is a flowchart for describing a method of controlling a digital image signal processing apparatus, according to another embodiment of the invention.

FIG. 17 is a flowchart for describing a method of controlling a digital image signal processing apparatus, according to another embodiment of the invention.

Referring to FIG. 17, a preview image is generated (operation S31).

It is determined whether a zooming operation is being performed (operation S32). If a zooming operation is not performed, the preview image is generated and displayed until a photographing operation is performed (operation S38).

If a zooming operation is performed, it is determined whether optical zoom may be performed (operation S33). In other words, it is determined whether the maximum optical zoom has already been applied. If the maximum optimal zoom has not been applied, a zoom lens is driven according to the zooming operation (operation S34).

If the maximum optimal zoom has been applied, it is determined whether digital zoom may be performed (operation S35). If the digital zoom may be performed, the preview image is enlarged, according to the digital zooming operation (operation S36).

If it is not possible to apply the digital zoom (operation S36), a display image that displays the distance information and/or additional information regarding the object and/or the objects of interest is generated and displayed (operation S37). For example, a first display image displaying the distance information regarding the object may be generated and displayed. Alternatively, a second display image that displays the additional distance information regarding the object may be displayed. To display the distance and additional information regarding the object, the first display image and the second display image may be displayed together (e.g., overlaid or overlapped). Alternatively, the third display image that displays a preview image and the additional information together may be generated and displayed. In the same regard, the distance and additional information regarding the object may be displayed together with a preview image.

Furthermore, the fourth display image, which displays distance information regarding an object of interest, may be generated and displayed. Furthermore, the fifth display image, which displays additional information of the object of interest, may be generated and displayed. The fourth display image and the fifth display image may be displayed together to display the distance information and the additional information regarding the object of interest together (e.g., overlaid or overlapped).

The distance information regarding the object to be photographed or the object of interest may be displayed in a display image as a dot within a range of 1 km around the digital camera. Furthermore, the additional information may be displayed as a display image displaying text description of the object. However, the invention is not limited thereto, and the distance information and/or additional information may be displayed by generating and displaying any of various types of display images.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as ROM, random-access memory (RAM), a CD, a DVD, magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of controlling a digital image photographing apparatus, the method comprising:
    generating a preview image by photographing an object;
    applying an optical zoom or a digital zoom;
    determining whether maximum optical zoom and/or maximum digital zoom is/are applied;
    detecting a current location of the digital image photographing apparatus;
    detecting a photographing direction in which the digital image photographing apparatus photographed the object;
    generating distance information regarding the object; and
    displaying the distance information regarding the object according to the photographing direction around the current location of the digital image photographing apparatus,
    wherein displaying the distance information regarding the object comprises displaying the distance information regarding the object in the photographing direction from the current location of the digital image photographing apparatus when the maximum optical zoom and/or the maximum digital zoom is/are applied.

2. The method of claim 1, further comprising:
    acquiring additional information regarding the object from a database storing additional information according to location information of the object; and
    displaying the additional information.

3. The method of claim 2, wherein the digital image photographing apparatus comprises a display unit on a front surface and on a rear surface,
    the distance information being displayed on one of the display units, and
    the additional information being displayed on the other one of the display units.

4. The method of claim 1, wherein displaying the distance information regarding the object comprises displaying the preview image and the distance information regarding the object.

5. The method of claim 1, further comprising:
    detecting an object of interest located within a predetermined distance range around the current location of the digital image photographing apparatus;
    generating distance information regarding the object of interest; and
    displaying the distance information regarding the object of interest.

6. The method of claim 5, further comprising setting the predetermined distance range around the current location of the digital image photographing apparatus according to a user operation.

7. The method of claim 6, wherein, setting the predetermined distance range around the current location of the digital image photographing apparatus, according to a user operation, comprises setting a larger distance range from the current location of the digital image photographing apparatus as the user operates an operating unit for instructing enlargement of an image.

8. The method of claim 5, further comprising:
    detecting additional information regarding the object of interest from a database storing additional information according to objects of interest; and
    displaying the additional information regarding the object of interest.

9. The method of claim 1, further comprising performing auto-focus (AF) with respect to the preview image to focus on the object, wherein generating distance information regarding the object comprises generating the distance information regarding the object via the AF operation.

10. A digital image photographing apparatus comprising:
- a preview generating unit to generate a preview image by photographing an object;
- a location information detecting unit to detect a current location of the digital image photographing apparatus;
- a directional information detecting unit to detect a photographing direction in which the digital image photographing apparatus photographed the object;
- a first distance information generating unit to generate distance information regarding the object;
- a display image generating unit to generate a first display image that displays the distance information regarding the object according to the photographing direction around the current location of the digital image photographing apparatus;
- a driving unit to apply an optical zoom;
- an image enlarging unit to apply a digital zoom; and
- a determining unit to determine whether maximum optical zoom and/or maximum digital zoom is/are applied,
- wherein the display image generating unit is to generate the first display image that displays the distance information regarding the object in the photographing direction from the current location of the digital image photographing apparatus when the maximum optical zoom and/or the maximum digital zoom is/are applied.

11. The digital image photographing apparatus of claim 10, further comprising an additional information generating unit to acquire additional information regarding the object from a database storing additional information according to location information of the object,
- wherein the display image generating unit is to generate a second display image that displays the additional information.

12. The digital image photographing apparatus of claim 11, further comprising a display unit on a front surface and on a rear surface,
- wherein the first display image or a fourth display image is displayed on one of the display units, and
- the second display image or a fifth display image is displayed on the other one of the display units.

13. The digital image photographing apparatus of claim 10, wherein the display image generating unit is to generate a third display image that displays the preview image and the distance information regarding the object.

14. The digital image photographing apparatus of claim 10, further comprising:
- a detecting unit to detect an object of interest located within a predetermined distance range around the current location of the digital image photographing apparatus; and
- a second distance information generating unit to generate distance information regarding the object of interest,
- wherein the display image generating unit is to generate a fourth display image that displays the distance information regarding the object of interest.

15. The digital image photographing apparatus of claim 14, further comprising a distance range setting unit to set the predetermined distance range around the current location of the digital image photographing apparatus.

16. The digital image photographing apparatus of claim 15, further comprising an operation console by which a user instructs to enlarge an image,
- wherein the distance range setting unit is to set a farther distance range from the current location of the digital image photographing apparatus as the user operates the operation console for instructing enlargement of the image.

17. The digital image photographing apparatus of claim 14, further comprising an additional information generating unit to detect additional information regarding the object of interest from a database storing additional information according to the objects of interest,
- wherein the display image generating unit is to generate a fifth display image that displays the information regarding the object of interest.

18. The digital image photographing apparatus of claim 10, further comprising a focus adjusting unit to perform autofocus (AF) with respect to the preview image to focus on the object,
- wherein the first distance information generating unit is to generate the distance information regarding the object via the AF operation.

* * * * *